US011960227B2

(12) United States Patent
Tachibana et al.

(10) Patent No.: US 11,960,227 B2
(45) Date of Patent: Apr. 16, 2024

(54) POWER TRANSMISSION MEMBER WITH TEETH AND GROOVES, TRANSFER DEVICE, AND IMAGE FORMING APPARATUS

(71) Applicant: FUJIFILM Business Innovation Corp., Tokyo (JP)

(72) Inventors: Kohei Tachibana, Kanagawa (JP); Yuya Shiokawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/994,184

(22) Filed: Nov. 25, 2022

(65) Prior Publication Data

US 2023/0384721 A1 Nov. 30, 2023

(30) Foreign Application Priority Data

May 26, 2022 (JP) ................................ 2022-086218

(51) Int. Cl.
*G03G 15/00* (2006.01)
*G03G 21/18* (2006.01)

(52) U.S. Cl.
CPC ..... *G03G 15/5008* (2013.01); *G03G 15/5004* (2013.01); *G03G 15/80* (2013.01); *G03G 21/1857* (2013.01); *G03G 21/1867* (2013.01)

(58) Field of Classification Search
USPC .......................................................... 399/258
See application file for complete search history.

(56) References Cited

U.S. PATENT DOCUMENTS

| | | | | |
|---|---|---|---|---|
| 6,185,390 B1 * | 2/2001 | Higeta | ............... | G03G 21/1867 399/167 |
| 8,045,889 B2 | 10/2011 | Nieda | | |
| 8,185,027 B2 | 5/2012 | Nieda | | |
| 2009/0245869 A1 | 10/2009 | Nieda | | |
| 2012/0014715 A1 | 1/2012 | Nieda | | |
| 2018/0210390 A1 * | 7/2018 | Okuno | ............... | G03G 21/1676 |

FOREIGN PATENT DOCUMENTS

| | | |
|---|---|---|
| JP | 2005-091793 A | 4/2005 |
| JP | 2009-237107 A | 10/2009 |
| JP | 2013-120241 A | 6/2013 |

* cited by examiner

*Primary Examiner* — Quana Grainger
(74) *Attorney, Agent, or Firm* — Oliff PLC

(57) ABSTRACT

A power transmission member includes: a male member formed from a resin material and including a plurality of engagement teeth arranged at regular intervals in a circumferential direction when viewed in an axial direction, the engagement teeth having a uniform thickness in a radial direction; a female member including a to-be-engaged portion to which the engagement teeth are fitted as a result of the female member moving in the axial direction relative to the male member; and a fitting member disposed at the male member and the female member, the fitting member fitting the engagement teeth to the to-be-engaged portion while the male member and the female member are located in predetermined opposing positions in the circumferential direction to engage the male member and the female member with each other.

18 Claims, 14 Drawing Sheets

POWER TRANSMISSION MEMBER WITH TEETH AND GROOVES, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-086218 filed May 26, 2022.

BACKGROUND

(i) Technical Field

The present disclosure relates to a power transmission member, a transfer device, and an image forming apparatus.

(ii) Related Art

Japanese Unexamined Patent Application Publication No. 2005-091793 describes a photoconductor drum unit in a removable process cartridge included in an image forming apparatus, wherein the photoconductor drum unit includes a coupling disposed on a shaft protruding from a first end of the photoconductor drum unit, the coupling transmits a rotational force from a driving shaft of the image forming apparatus to the photoconductor drum, the coupling has a shape uniquely coupled to a body driving shaft, and the coupling is capable of being coupled to a protruding shaft of the photoconductor drum in any rotational direction.

SUMMARY

A power transmission member that connects a driving shaft and a driven shaft includes a male member formed from a resin material, and a female member that is fitted to the male member. The male member includes engagement teeth, and the female member includes to-be-engaged portions with which the engagement teeth in the male member are engaged as a result of the male member and the female member being moved relative to each other in the axial direction.

In the existing power transmission member where the male member and the female member are fitted to each other at a predetermined position in the circumferential direction, the engagement teeth have different shapes when viewed in the axial direction. Specifically, the thickness of one engagement tooth in a radial direction and a thickness of another engagement tooth in the radial direction differ from each other. Thus, the shape of the engagement teeth varies from product to product due to the variation of die shrinkage in forming. To address this, gaps between the engagement teeth and the to-be-engaged portions in the circumferential direction are to be increased. In other words, the quantity of backlash between the engagement teeth and the to-be-engaged portion in the circumferential direction increases.

Aspects of non-limiting embodiments of the present disclosure relate to a power transmission member where a male member and a female member are fitted to each other at a predetermined position in the circumferential direction, wherein the quantity of backlash between engagement teeth and to-be-engaged portions in the circumferential direction is reduced further than in a structure where the thickness of one engagement tooth in a radial direction and the thickness of another engagement tooth in the radial direction vary from one to another.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a power transmission member that includes: a male member formed from a resin material and including a plurality of engagement teeth arranged at regular intervals in a circumferential direction when viewed in an axial direction, the engagement teeth having a uniform thickness in a radial direction; a female member including a to-be-engaged portion to which the engagement teeth are fitted as a result of the female member moving in the axial direction relative to the male member; and a fitting member disposed at the male member and the female member, the fitting member fitting the engagement teeth to the to-be-engaged portion while the male member and the female member are located in predetermined opposing positions in the circumferential direction to engage the male member and the female member with each other.

BRIEF DESCRIPTION OF THE DRAWINGS

Exemplary embodiments of the present disclosure will be described in detail based on the following figures, wherein.

DETAILED DESCRIPTION

With reference to FIGS. 1 to 14C, a power transmission member, a transfer device, and an image forming apparatus according to an exemplary embodiment of the present disclosure will be described as examples. Arrow H in each drawing indicates the vertical direction or an apparatus vertical direction, arrow W indicates the horizontal direction and an apparatus width direction, and arrow D indicates the horizontal direction and an apparatus depth direction.

Entire Structure of Image Forming Apparatus 10

Figure 1:
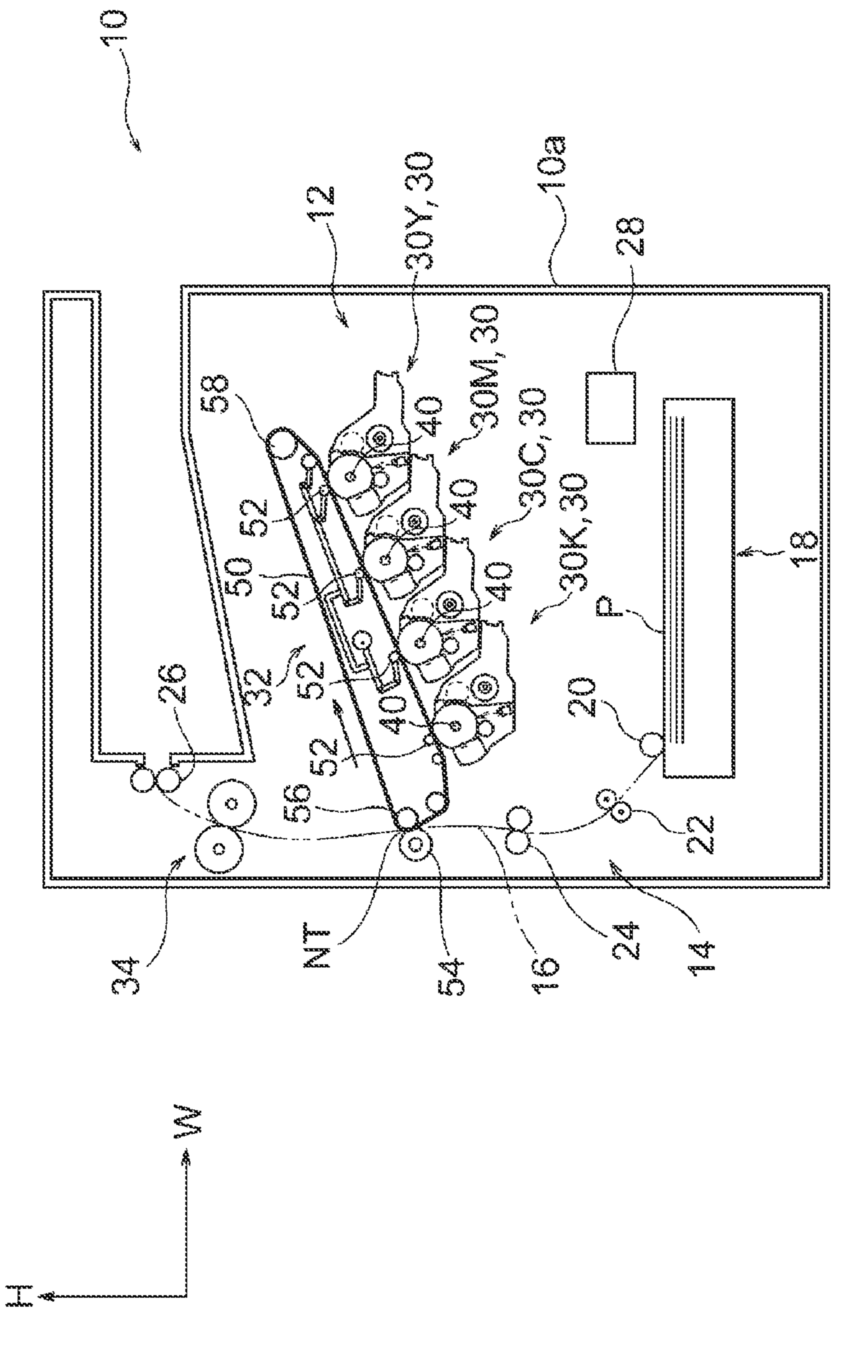
FIG. 1 is a schematic diagram of an image forming apparatus according to an exemplary embodiment of the present disclosure.

As illustrated in FIG. 1, an image forming apparatus 10 includes an image forming portion 12 that forms toner images with an electrophotographic system, and a transport portion 14 that transports sheet members P serving as recording media along a transport path 16. The image forming apparatus 10 includes a container member 18 that accommodates the sheet members P, and a controller 28 that controls the entirety of the apparatus.

In the image forming apparatus 10, the transport portion 14 transports the sheet members P accommodated in the container member 18 along the transport path 16. The toner images formed by the image forming portion 12 are transferred to the transported sheet members P, and the sheet members P to which the toner images are transferred are discharged to the outside of an apparatus body 10*a*.

Image Forming Portion 12

As illustrated in FIG. 1, the image forming portion 12 includes multiple toner image forming portions 30 that form toner images of respective colors, and a transfer portion 32 that transfers the toner images formed by the toner image forming portions 30 to the sheet members P. The image forming portion 12 also includes a fixing device 34 that fixes the toner images transferred by the transfer portion 32 to the sheet members P onto the sheet members P.

Toner Image Forming Portions 30

The multiple toner image forming portions 30 are provided to form toner images of respective colors. In the present exemplary embodiment, toner image forming portions 30Y, 30M, 30C, and 30K for four colors including yellow (Y), magenta (M), cyan C, and black (K) are provided. In the following description, the characters Y, M, C, and K appended to reference signs are omitted when the colors of yellow (Y), magenta (M), cyan C, and black (K) are not distinguished from each other.

Figure 2:
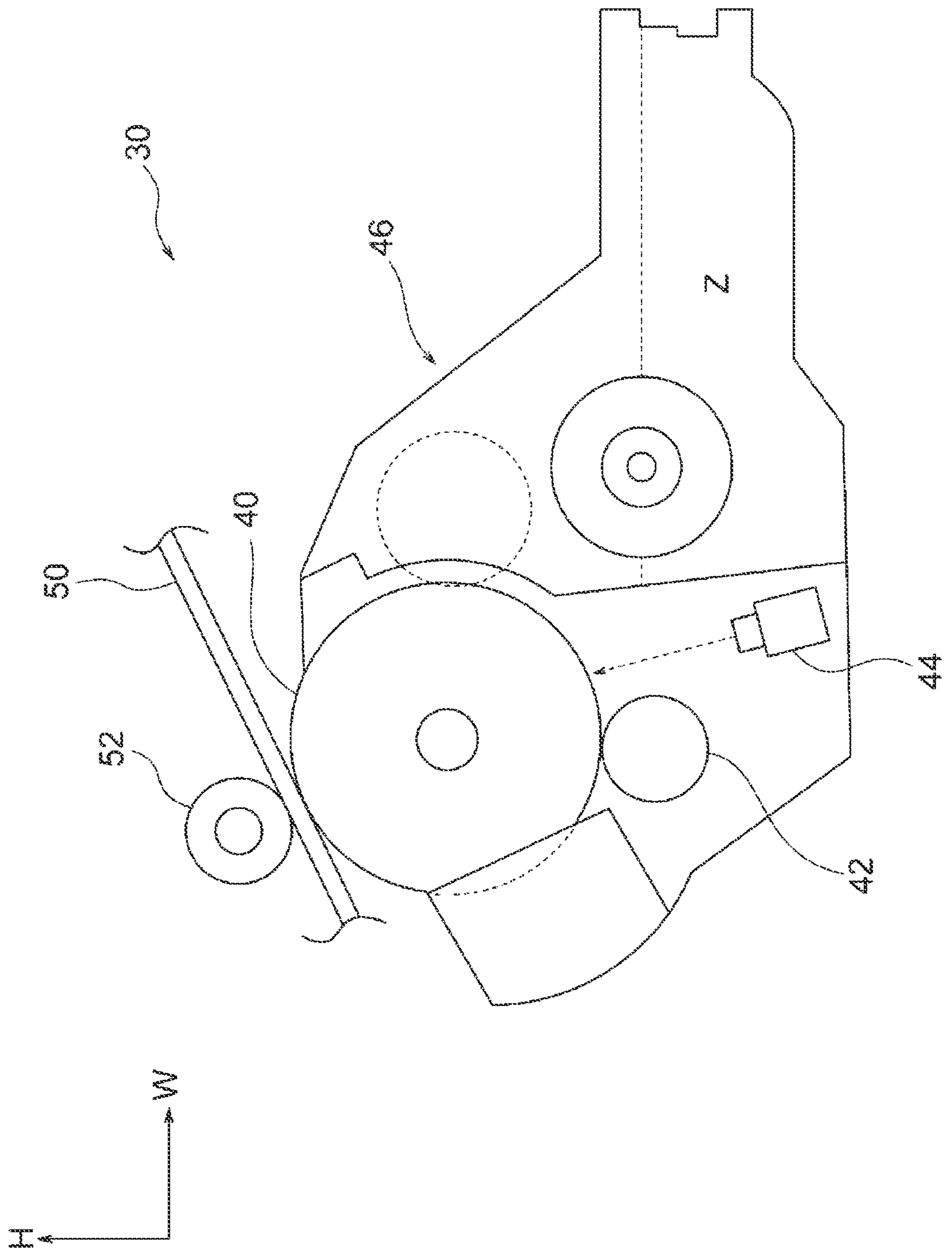
FIG. 2 is a structure diagram of a toner image forming portion in an image forming apparatus according to an exemplary embodiment of the present disclosure.

The toner image forming portions 30 for the respective colors have basically the same structure except for toner used therein, and each include, as illustrated in FIG. 2, a rotational cylindrical image carrier 40, and a charging device 42 that charges the image carrier 40 with electricity. The toner image forming portions 30 each include an exposure device 44 that irradiates the charged image carrier 40 with exposure light to form an electrostatic latent image, and a developing device 46 that develops the electrostatic latent image with a developer Z containing toner into a toner image. Thus, the toner image forming portions 30 for the respective colors form images of the respective colors with toner of the respective colors.

As illustrated in FIG. 1, the image carriers 40 for the respective colors are in contact with a transfer belt 50 (described below in detail) that rotates. In the rotation direction (refer to arrow in FIG. 1) of the transfer belt 50, the toner image forming portions 30 for yellow (Y), magenta (M), cyan C, and black (K) are arranged in this order from the upstream side.

Transfer Portion 32

The transfer portion 32 has a function of transferring toner images formed by the toner image forming portions 30 to the sheet members P. The transfer portion 32 will be described below in detail.

Fixing Device 34

As illustrated in FIG. 1, the fixing device 34 is disposed downstream from a transfer nip NT in a transport direction of the sheet members P. The fixing device 34 heats and presses the toner image transferred to each sheet member P to fix the toner image to the sheet member P.

Transport Portion 14

As illustrated in FIG. 1, the transport portion 14 includes a dispatch roller 20 that dispatches the sheet members P accommodated in the container member 18 to the transport path 16, and restriction rollers 22 that restrict transportation of the overlapping sheet members P dispatched by the dispatch roller 20. The transport portion 14 also includes adjustment rollers 24 that adjust timing when each sheet member P is dispatched to the transfer nip NT, and discharge rollers 26 that discharge the sheet member P to which the toner image is fixed by the fixing device 34 to the outside of the apparatus body 10*a*.

Structure of Related Portions

Subsequently, the transfer portion 32 will be described. The transfer portion 32 is an example of a transfer device.

Figure 3:
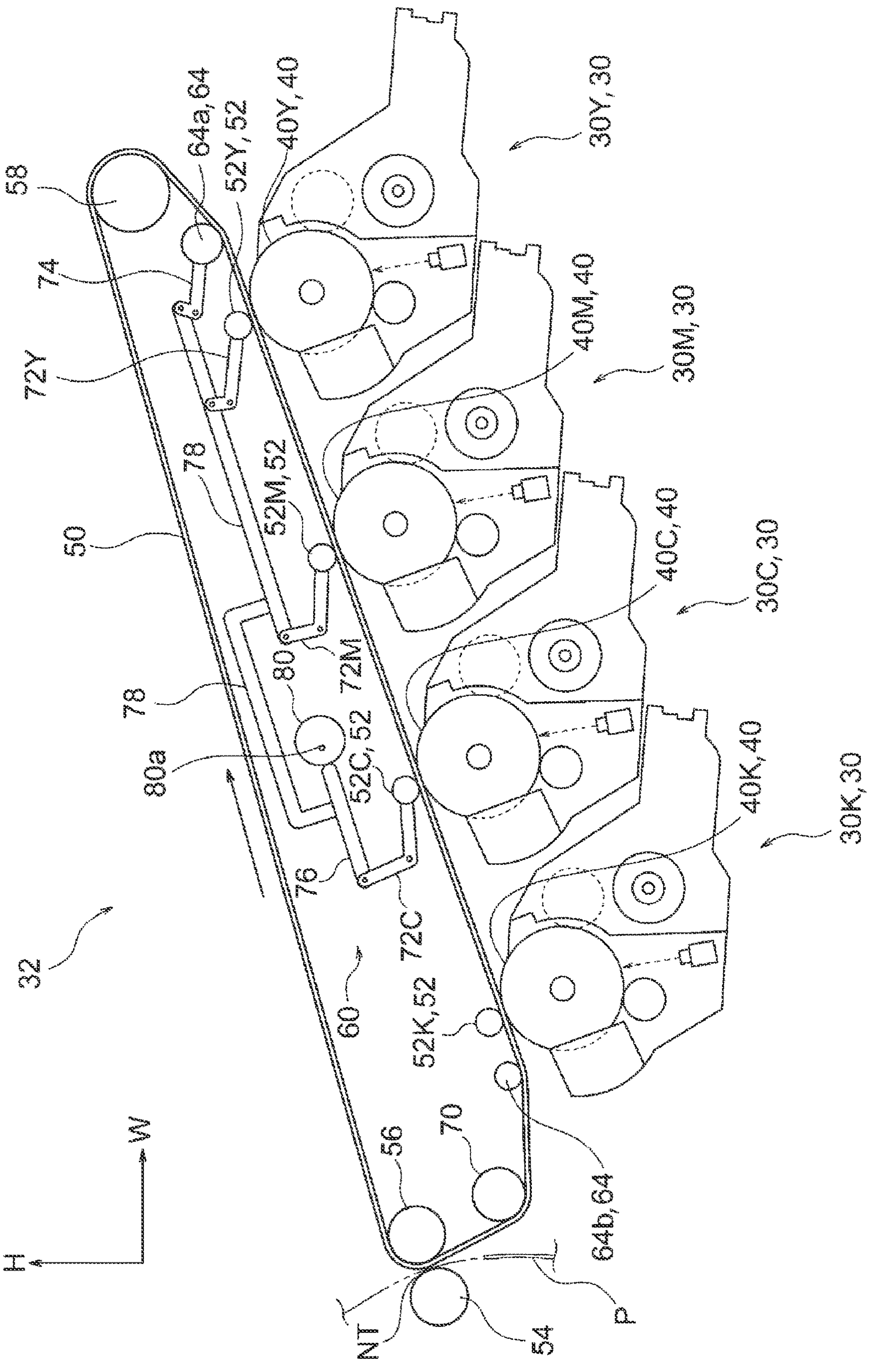
FIG. 3 is a front view of a transfer device according to an exemplary embodiment of the present disclosure when the transfer device is in a color mode.

As illustrated in FIG. 3, the transfer portion 32 includes a transfer belt 50, and first transfer rollers 52 that are disposed to face the image carriers 40 for the respective colors with the transfer belt 50 interposed therebetween, and that transfer, to the transfer belt 50, toner images formed on the image carriers 40 for the respective colors. The transfer portion 32 also includes a distance changer unit 60 that moves at least a subset of the multiple first transfer rollers 52 to move the transfer belt 50 and the corresponding image carrier 40 toward and away from each other. The distance changer unit 60 is an example of a distance changer.

The transfer portion 32 includes a winding roller 56 around which the transfer belt 50 is wound, a driving roller 58 around which the transfer belt 50 is wound and that transmits a rotational force to the transfer belt 50, and positioning rollers 64 that position the portions of the transfer belt 50 on which the toner images are transferred. The transfer portion 32 also includes a tension roller 70 that exerts a tension on the transfer belt 50.

The transfer portion 32 also includes a second transfer roller 54 disposed to face the winding roller 56 with the transfer belt 50 interposed therebetween to transfer the toner images transferred to the transfer belt 50 onto the sheet members P. A transfer nip NT that transfers the toner image to the sheet member P is formed between the second transfer roller 54 and the transfer belt 50.

Transfer Belt 50, Winding Roller 56, and Driving Roller 58

As illustrated in FIG. 3, the transfer belt 50 is endless, and disposed in a position having a first side portion in the apparatus width direction (left portion in the drawing) located lower than a second side portion. The transfer belt 50 is an example of an endless member.

The winding roller 56 has an axis extending in the apparatus depth direction, and the first side portion of the transfer belt 50 in the apparatus width direction is wound around the winding roller 56. The driving roller 58 has an axis extending in the apparatus depth direction, and the second side portion of the transfer belt 50 in the apparatus width direction wound around the driving roller 58.

In this structure, when the driving roller 58 rotates with a driving force transmitted from a driving source not illustrated, the transfer belt 50 rotates in the direction of arrow (clockwise direction) in the drawing.

First Transfer Rollers 52, and Second Transfer Roller 54

As illustrated in FIG. 3, the first transfer rollers 52 for the respective colors are disposed downstream from the driving roller 58 and upstream from the winding roller 56 in the rotation direction ("belt rotation direction" below) of the transfer belt 50. The first transfer rollers 52 for the respective colors face the image carriers 40 for the respective colors with the transfer belt 50 interposed therebetween, and are in contact with the inner circumferential surface of the transfer belt 50. The second transfer roller 54 faces the winding roller 56 with the transfer belt 50 interposed therebetween. The first transfer rollers 52 are examples of first transfer members, and the second transfer roller 54 is an example of a second transfer member.

In this structure, the first transfer rollers 52 for the respective colors transfer toner images formed on the image carriers 40 for the respective colors to the transfer belt 50 while holding the transfer belt 50 between themselves and the image carriers 40 for the respective colors. The second transfer roller 54 also transfers the toner images transferred to the transfer belt 50 by the first transfer rollers 52 to the sheet member P transported at the transfer nip NT.

Tension Roller 70, and Positioning Rollers 64

As illustrated in FIG. 3, the tension roller 70 is disposed downstream from a first transfer roller 52K and upstream from the second transfer roller 54 in the belt rotation direction. The tension roller 70 is in contact with the inner circumferential surface of the transfer belt 50 to press the transfer belt 50. Thus, a tension is exerted on the transfer belt 50.

As illustrated in FIG. 3, the positioning rollers 64 form a pair and are disposed to be on both sides of all the first transfer rollers 52 in the belt rotation direction. More specifically, the positioning rollers 64 include an positioning roller 64*a* disposed upstream from all the first transfer rollers 52 in the belt rotation direction, and an positioning roller 64*b* disposed downstream from all the first transfer rollers 52.

Distance Changer Unit 60

As illustrated in FIG. 3, the distance changer unit 60 is surrounded by the transfer belt 50 when viewed in the apparatus depth direction. The distance changer unit 60 includes L-shaped arms 72C that rotatably support a first transfer roller 52C at their first ends, and L-shaped arms 72M that rotatably support a first transfer roller 52M at their first ends. The distance changer unit 60 also includes L-shaped arms 72Y that rotatably support a first transfer roller 52Y at their first ends, and L-shaped arms 74 that rotatably support the positioning roller 64*a* at their first ends. These L-shaped arms 72C, 72M, 72Y, or 74 form pairs, and the arms in each pair are spaced apart from each other in the apparatus depth direction.

The distance changer unit 60 also includes straight arms 76 having first ends rotatably coupled to second ends of the L-shaped arms 72C and extending toward the driving roller 58, and an eccentric cam 80 having a cam surface that is in contact with second ends of the arms 76. The distance changer unit 60 also includes urging members (not illustrated) that urge the second ends of the arms 76 toward the cam surface of the eccentric cam 80.

The distance changer unit 60 also includes multiple arms 78 that transmit the movement of the arms 76 to the second ends of the L-shaped arms 72M, 72Y, and 74.

Figure 4:
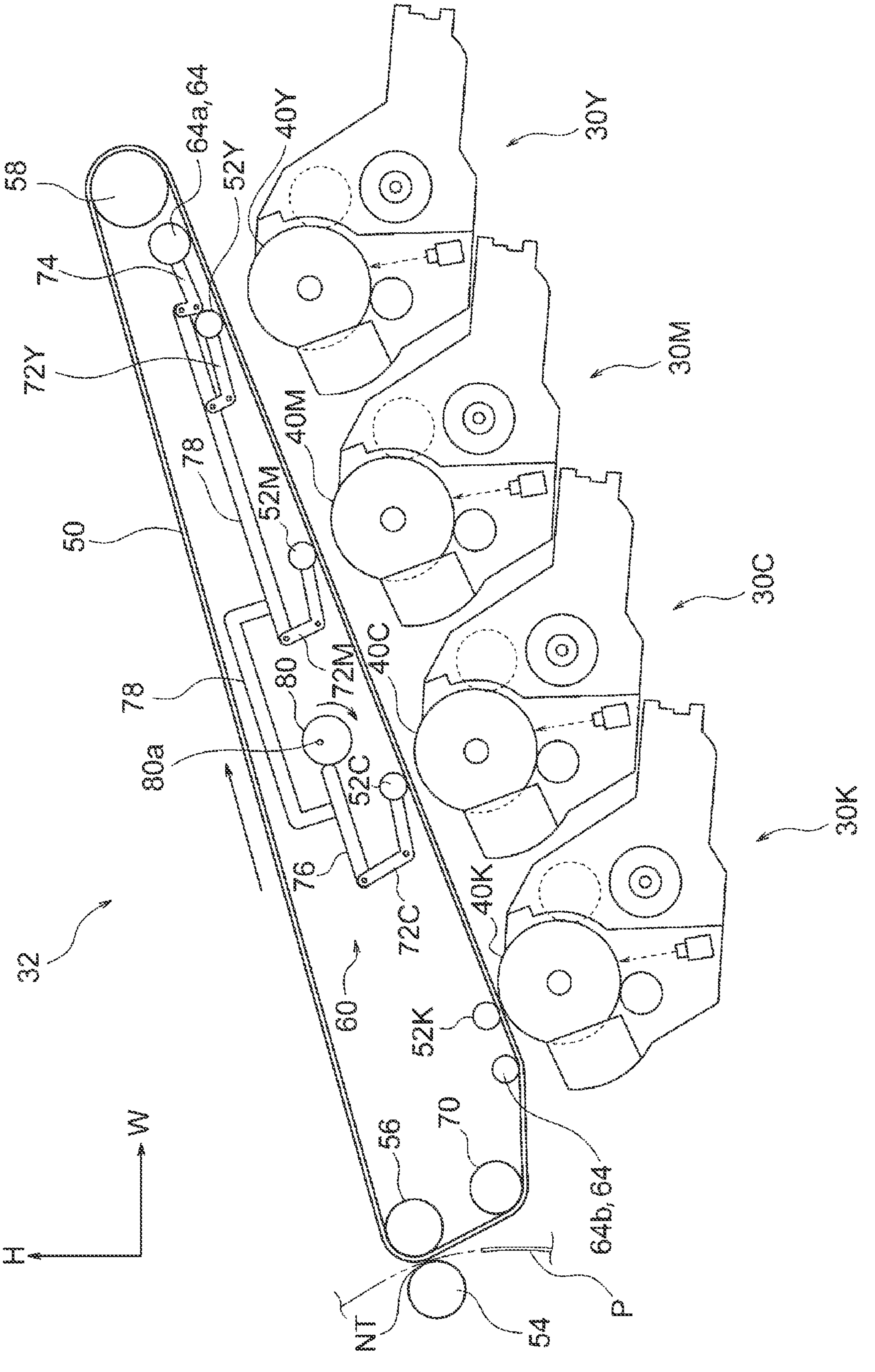
FIG. 4 is a front view of a transfer device according to an exemplary embodiment of the present disclosure when the transfer device is shifted from the color mode to a monochrome mode.
Figure 5:
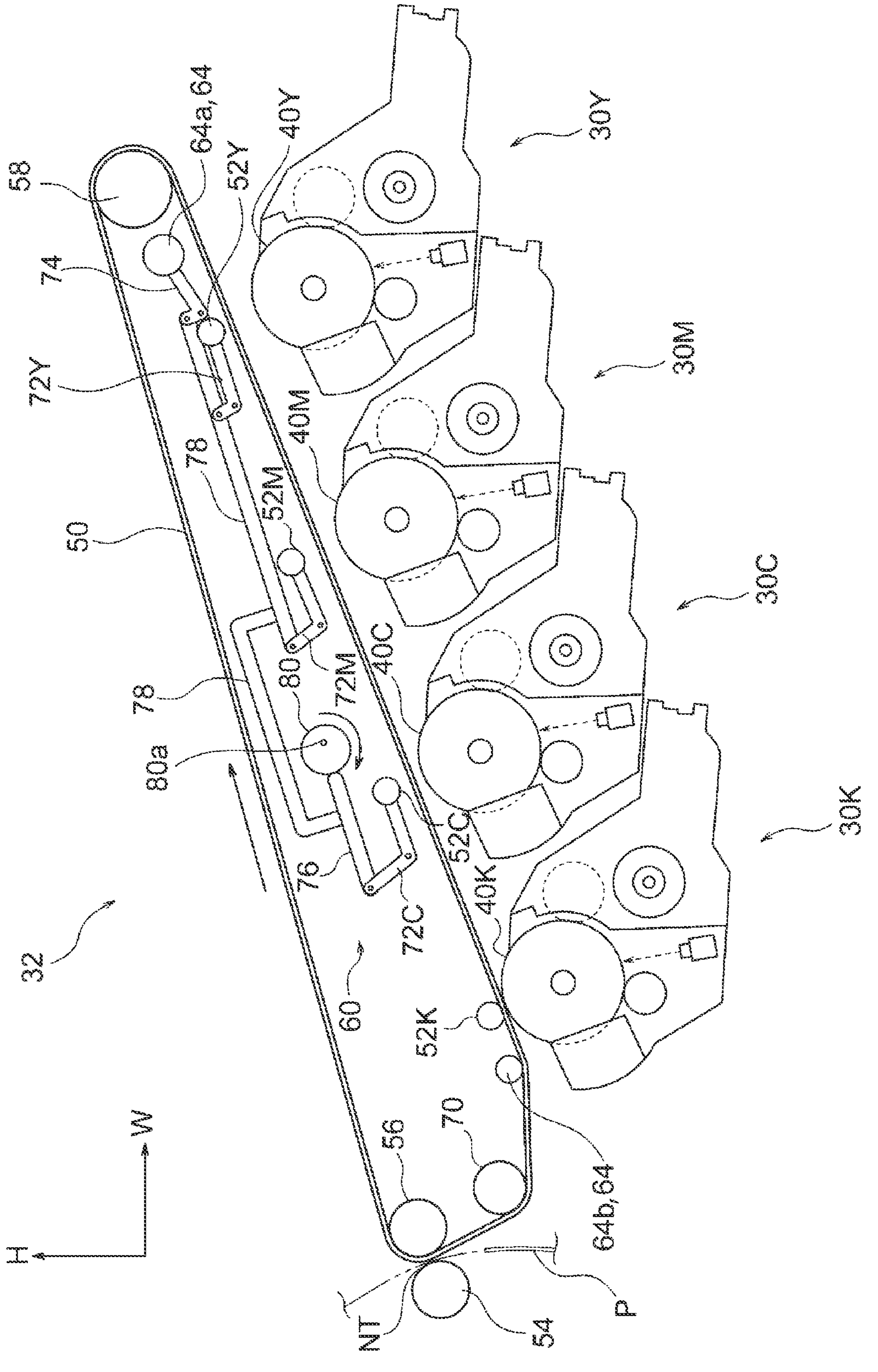
FIG. 5 is a front view of a transfer device according to an exemplary embodiment of the present disclosure when the transfer device is in the monochrome mode.

In this structure, as illustrated in FIG. 3, FIG. 4, and FIG. 5, when the eccentric cam 80 is rotated half a turn about a rotation shaft 80*a*, the L-shaped arms 72C, 72M, 72Y, and 74 rotate about their bent portions, and the first transfer rollers 52C, 52M, and 52Y move apart from the inner circumferential surface of the transfer belt 50. Thus, the transfer belt 50 tensioned by the tension roller 70 changes its position to move away from image carriers 40C, 40M, and 40Y.

When the rotation shaft 80*a* is rotated half a turn about the eccentric cam 80, the mode is switched from a color mode where all the image carriers 40 are in contact with the transfer belt 50, to a monochrome mode where an image carrier 40K alone is in contact with the transfer belt 50.

In this case, the rotational force is transmitted from the apparatus body 10*a* to the rotation shaft 80*a* with a shaft not illustrated. A power transmission member 100 that enables separation of the shaft into a first half and a second half is disposed at the intermediate portion of the shaft. Thus, the transfer portion 32 is attachable to and removable from the apparatus body 10*a*.

Hereinbelow, the power transmission member 100 will be described in detail below.

Power Transmission Member 100

Figure 6B:
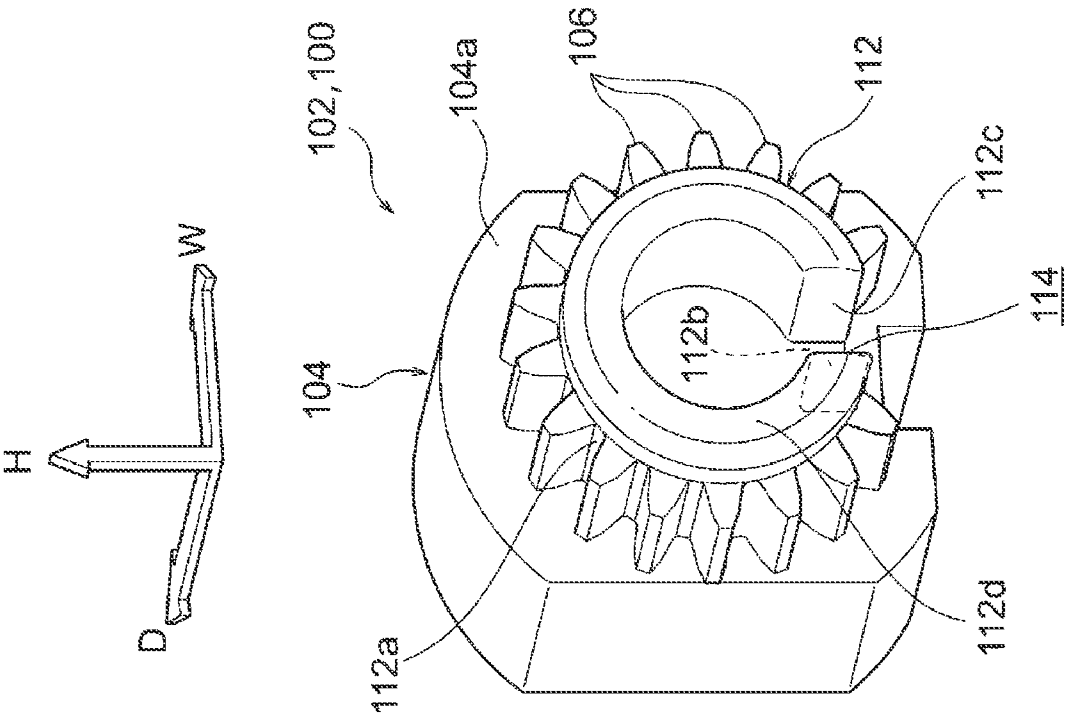
FIGS. 6A and 6B are perspective views of a female member and a male member in a power transmission member according to an exemplary embodiment of the present disclosure.
Figure 6A:
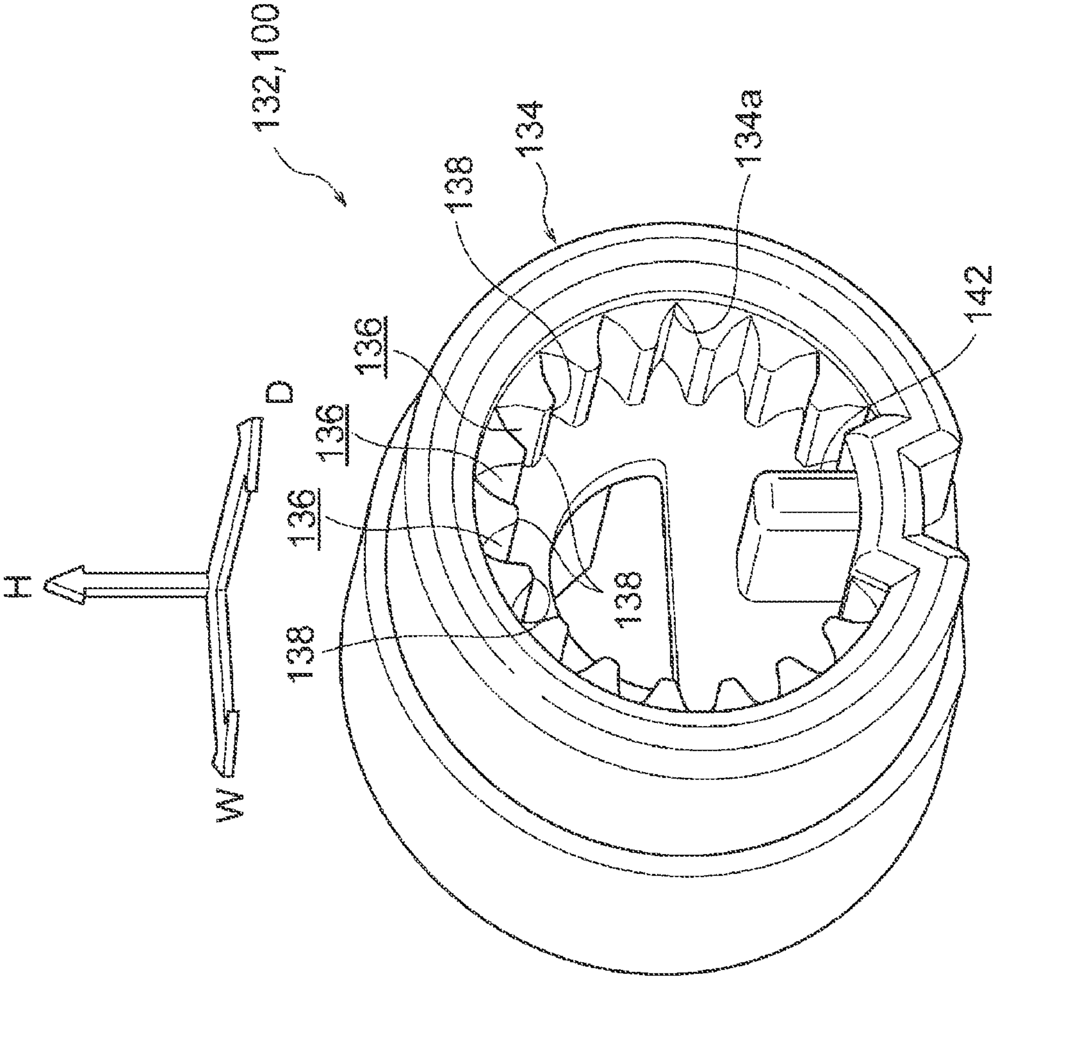

As illustrated in FIGS. 6A and 6B, the power transmission member 100 is a so-called coupling, and includes a male member 102 and a female member 132. The male member 102 is attached to an end portion of the shaft closer to the apparatus body 10*a* (refer to FIG. 1), and the female member 132 is attached to an end portion of the shaft forming the rotation shaft 80*a* of the eccentric cam 80 (refer to FIG. 3).

Male Member 102

As illustrated in FIG. 6B, the male member 102 is integrally formed from a resin material, and includes a base portion 104 having a base end surface 104*a* facing in the axial direction, and multiple engagement teeth 106 protruding in the axial direction from the base end surface 104*a*. The male member 102 also includes an arc-shaped portion 112 that protrudes in the axial direction from the base end surface 104*a* and has an arc-shape when viewed in the axial direction. The arc-shaped portion 112 is an example of a shaft portion.

In the present exemplary embodiment, the male member 102 is formed from, for example, a polyacetal resin (POM) through injection molding. In the present exemplary embodiment, the axial direction is the same as the apparatus depth direction.

The multiple engagement teeth 106 are arranged at the regular intervals in the circumferential direction. The engagement teeth 106 extend in the radial direction. The base ends of the engagement teeth 106 are spaced apart from the axial center when viewed in the axial direction. In this case, the base ends of the engagement teeth 106 are the end portions of the engagement teeth 106 closer to the axial center.

The engagement teeth 106 have the same thickness in the radial direction. Although the engagement teeth 106 are arranged at regular intervals in the circumferential direction, a gap between the engagement tooth 106 at the first end portion and the engagement tooth 106 at the second end portion is wider than the intervals between other pairs of the engagement teeth 106 arranged in the circumferential direction.

Figure 7:
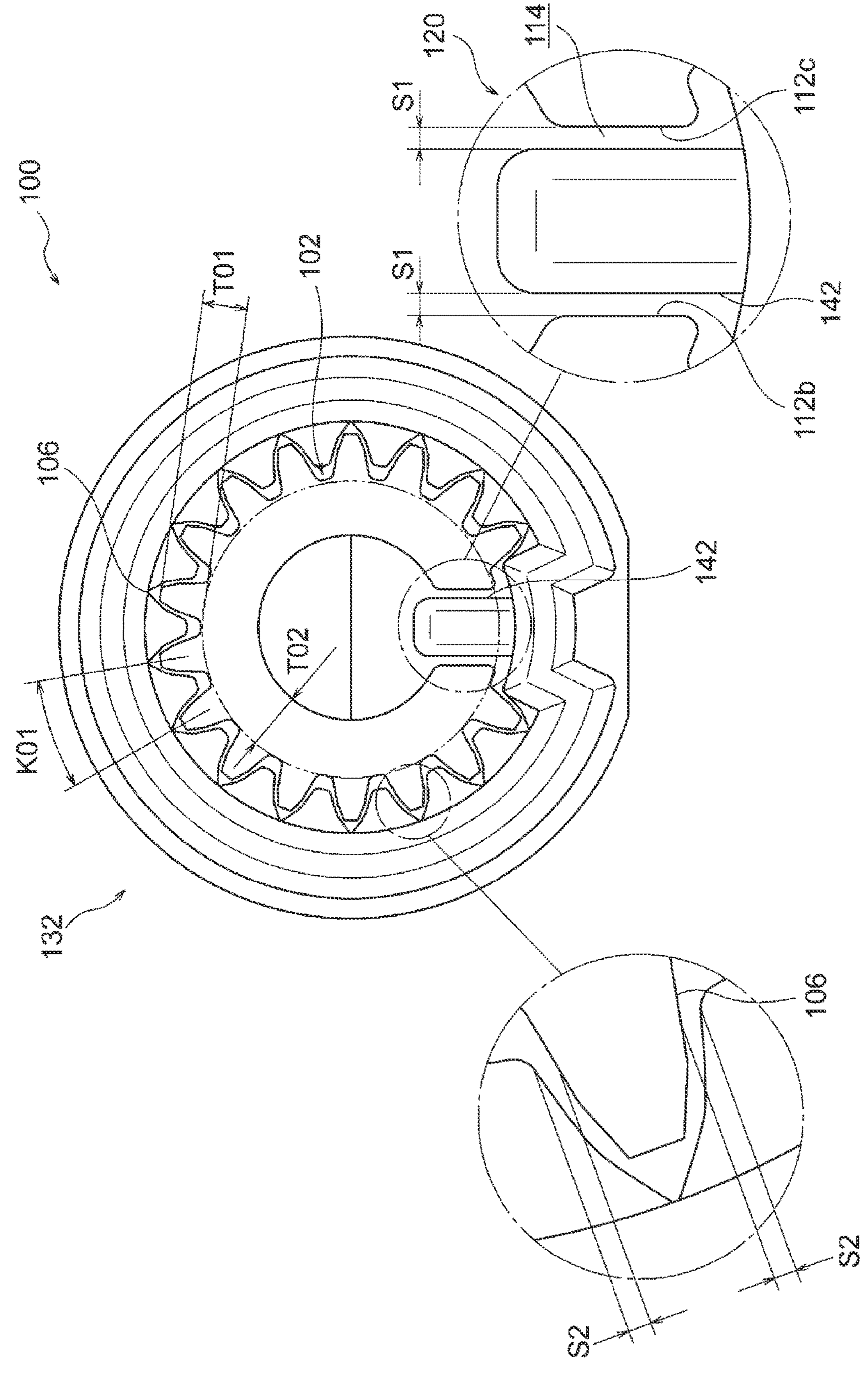
FIG. 7 is a front view of a power transmission member according to an exemplary embodiment of the present disclosure where the female member and the male member are fitted to each other.

In this case, as illustrated in FIG. 7, the thickness of the engagement teeth 106 in the radial direction is a thickness from the base end to the distal end of each engagement tooth 106 in the radial direction (refer to T01 in FIG. 7). The wording the engagement teeth 106 have a uniform thickness in the radial direction indicates that the difference between a greatest thickness Tmax and a smallest thickness Tmin is smaller than or equal to 10% of the greatest thickness Tmax. The regular interval indicates that the difference in interval between center lines of adjacent engagement teeth 106 (refer to K01 in FIG. 7) between a greatest interval Kmax and a smallest interval Kmin is smaller than or equal to 10% of the greatest interval Kmax when viewed in the axial direction.

As illustrated in FIG. 6B, the arc-shaped portion 112 is disposed on the base ends of the engagement teeth 106. The base ends of the engagement teeth 106 are connected to an outer circumferential surface 112*a* of the arc-shaped portion 112 facing outward in the radial direction. The engagement teeth 106 are arranged at regular intervals from the first end to the second end of the arc-shaped portion 112 extending in the circumferential direction. The thickness of the arc-shaped portion 112 in the radial direction is uniform throughout in the circumferential direction.

As illustrated in FIG. 7, the wording the thickness (T02 in FIG. 7) of the arc-shaped portion 112 in the radial direction is uniform indicates the case where the difference between the greatest thickness Tmax and the smallest thickness Tmin is smaller than or equal to 10% of the greatest thickness Tmax.

As illustrated in FIG. 6B, a first end surface 112*b* facing in the circumferential direction is formed at the first end portion of the arc-shaped portion 112 extending in the circumferential direction, and a second end surface 112*c* facing in the circumferential direction is formed at the second end portion of the arc-shaped portion 112. The first end surface 112*b* and the second end surface 112*c* face each other in the circumferential direction, and a cut portion 114 is formed between the first end surface 112*b* and the second end surface 112*c*.

The arc-shaped portion 112 has a top surface 112*d* facing in the axial direction. The top surface 112*d* protrudes outward in the axial direction with respect to the engagement teeth 106. The side of the male member 102 facing outward in the axial direction is the side facing the female member 132.

Female Member 132

As illustrated in FIG. 6A, the female member 132 is integrally formed from a resin material, and includes a hollow cylindrical portion 134 having an inner circumferential surface 134*a*, and to-be-engaged portions 136 with which the engagement teeth 106 (refer to FIG. 6B) are engaged as a result of moving relative to the male member 102 in the axial direction. The female member 132 includes an insertion portion 142 that is inserted into the cut portion 114 in the male member 102. In the present exemplary embodiment, the female member 132 is formed from, for example, a polyacetal resin (POM) through injection molding.

The multiple to-be-engaged portions 136 are disposed on the inner portion of the hollow cylindrical portion 134, and arranged at regular intervals in the circumferential direction along the inner circumferential surface 134*a*. Each of the to-be-engaged portions 136 is formed between adjacent two of multiple projections 138 arranged at regular intervals in the circumferential direction. The projections 138 protrude inward in the radial direction from the inner circumferential surface 134*a*, and are arranged at regular intervals in the circumferential direction.

Although the to-be-engaged portions 136 are arranged at regular intervals in the circumferential direction, a gap between the to-be-engaged portion 136 at the first end portion and the to-be-engaged portion 136 at the second end portion is wider than the intervals between other pairs of the to-be-engaged portions 136 arranged in the circumferential direction. A portion of the inner circumferential surface 134*a* of the hollow cylindrical portion 134 protrudes inward into the wide space from the outer side in the radial direction.

The insertion portion 142 extends inward in the radial direction from the protruding portion of the inner circumferential surface 134*a*. More specifically, the insertion portion 142 has a plate shape having a thickness in the circumferential direction. An outer end portion of the insertion portion 142 in the axial direction is aligned with the outer end portion of the projections 138 in the axial direction. Here, the outer side of the female member 132 in the axial direction is the side facing the male member 102.

When the male member 102 and the female member 132 are located in predetermined opposing positions in the circumferential direction, as illustrated in FIG. 7, the insertion portion 142 is inserted into the cut portion 114, and the engagement teeth 106 and the to-be-engaged portions 136 are engaged with each other. Thus, the male member 102 and the female member 132 are fitted to each other in the predetermined opposing positions in the circumferential direction.

Thus, a fitting portion 120 including the insertion portion 142 and the arc-shaped portion 112 having the cut portion 114 fits the male member 102 and the female member 132 to each other. The fitting portion 120 is an example of a fitting member.

In the state where the male member 102 and the female member 132 are fitted to each other, a gap (S1 in FIG. 7) between the insertion portion 142 and the first end surface 112*b* in the circumferential direction, and a gap (S1 in FIG. 7) between the insertion portion 142 and the second end surface 112*c* in the circumferential direction are wider than a gap (S2 in FIG. 7) between each engagement tooth 106 and the adjacent projection 138 in the circumferential direction.

Operations

Now, the operations of the power transmission member 100 is described in comparison with a power transmission member 300 according to a comparative example. First, the structure of the power transmission member 300 according to the comparative example is described. The power transmission member 300 is described mostly in terms of portions different from those in the power transmission member 100.

Structure of Power Transmission Member 300 According to Comparative Example

Figure 10B:
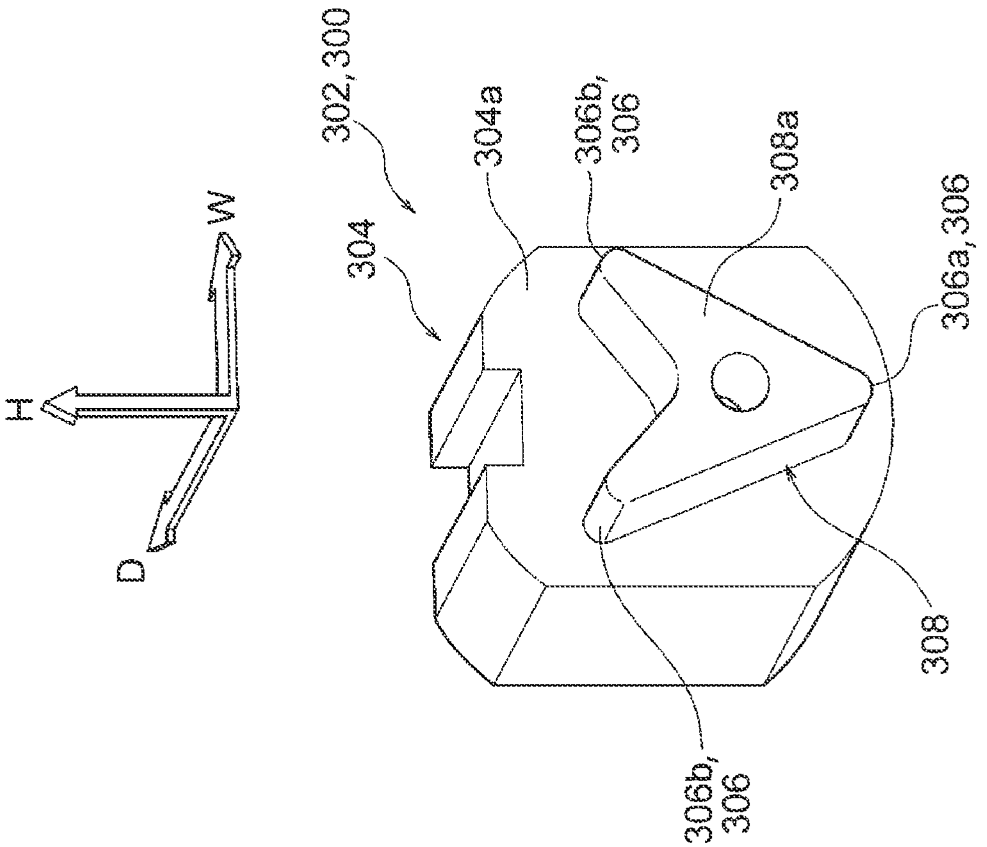
FIGS. 10A and 10B are perspective views of a female member and a male member in a power transmission member according to a comparative example with reference to the exemplary embodiment of the present disclosure.
Figure 10A:
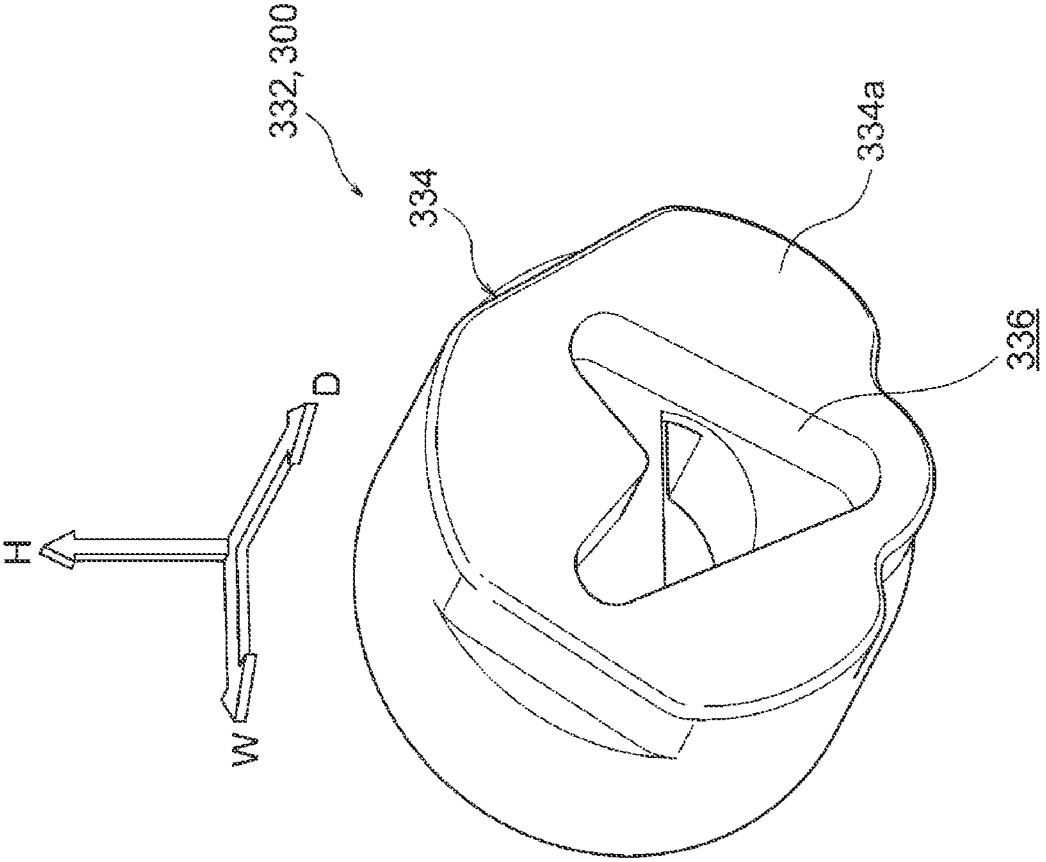

As illustrated in FIGS. 10A and 10B, the power transmission member 300 includes a male member 302 and a female member 332.

Male Member 302

As illustrated in FIG. 10B, the male member 302 includes a base portion 304 having a base end surface 304*a* facing in the axial direction and multiple engagement teeth 306 protruding in the axial direction from the base end surface 304*a*.

Specifically, an arrow portion 308 protrudes from the base end surface 304*a* in the axial direction, and has an arrow shape when viewed in the axial direction. The arrow portion 308 has a top surface 308*a* facing in the axial direction. Three portions of the arrow portion 308 protruding outward in the radial direction serve as the engagement teeth 306. In the following description, the engagement tooth 306 disposed at the distal end of the arrow portion 308 is referred to as an engagement tooth 306*a*, and the pair of engagement teeth 306 disposed at the base end of the arrow portion 308 are referred to as engagement teeth 306*b*. When the engagement tooth 306*a* and the engagement teeth 306*b* are not distinguished from each other, the reference signs exclude the alphabetic characters at the end thereof.

Figure 11:
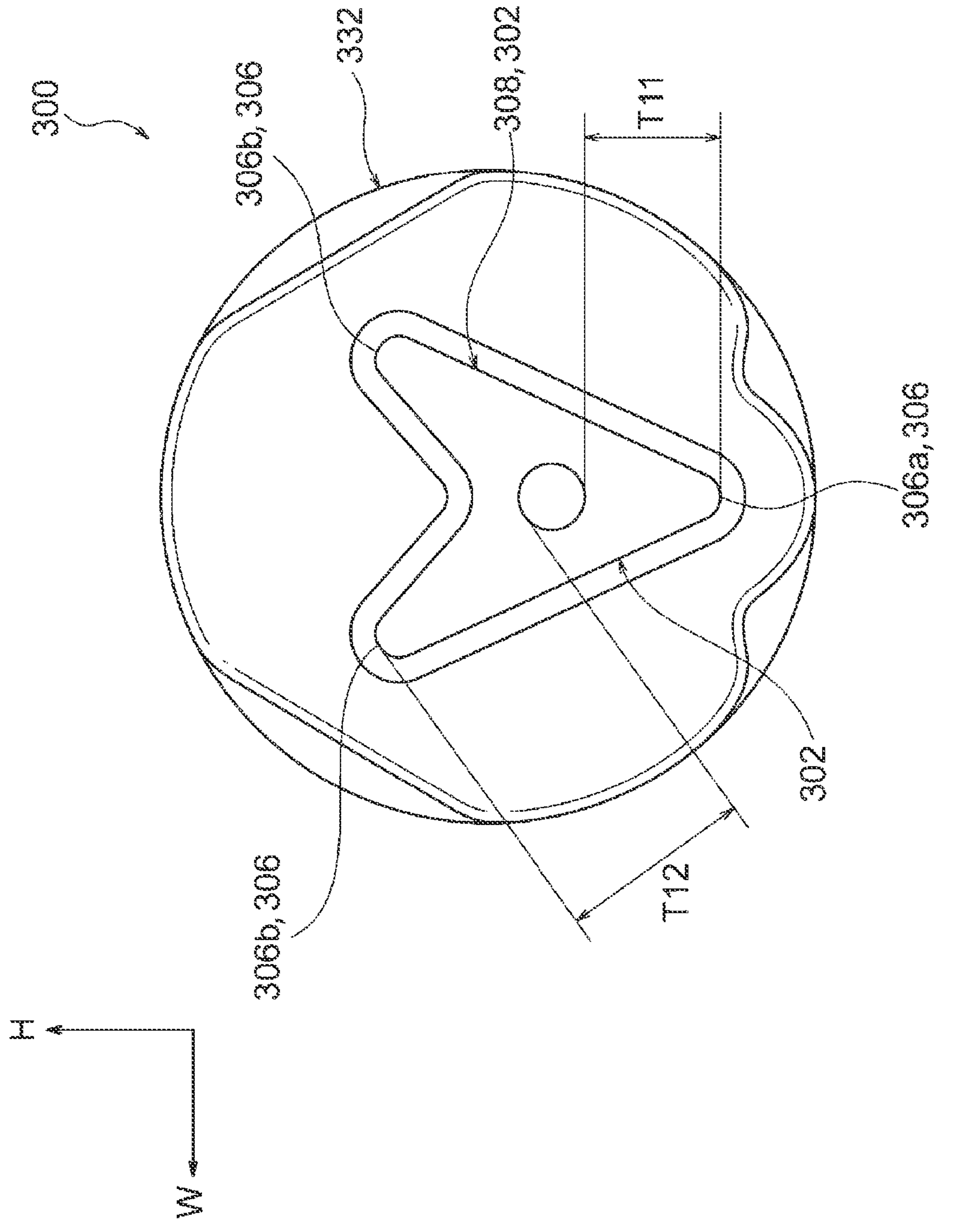
FIG. 11 is a front view of a power transmission member according to a comparative example with reference to the exemplary embodiment of the present disclosure where the female member and the male member are fitted to each other.

As illustrated in FIG. 11, the thickness (T11 in FIG. 11) of the engagement tooth 306*a* in the radial direction and the thickness (T12 in FIG. 11) of the engagement teeth 306*b* in the radial direction are different from each other. In other words, the thickness T11 and the thickness T12 are not the same.

Female Member 332

As illustrated in FIG. 10A, the female member 332 includes a body portion 334 having a to-be-engaged portion 336, which is an arrow-shaped recess. More specifically, the body portion 334 has a body surface 334*a* facing in the axial direction, and the to-be-engaged portion 336 that is to be engaged with the engagement teeth 306 is recessed from the body surface 334*a*.

Figure 12B:
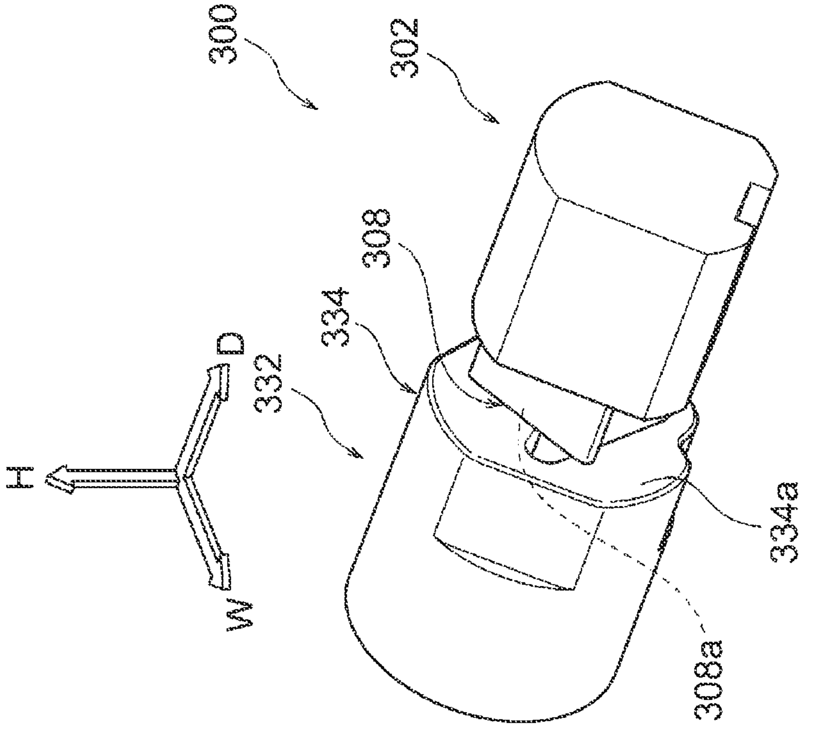
FIGS. 12A and 12B are respectively a front view and a perspective view of a power transmission member according to a comparative example with reference to the exemplary embodiment of the present disclosure where the male member and the female member are located in positions different from the predetermined opposing positions in the circumferential direction.
Figure 12A:
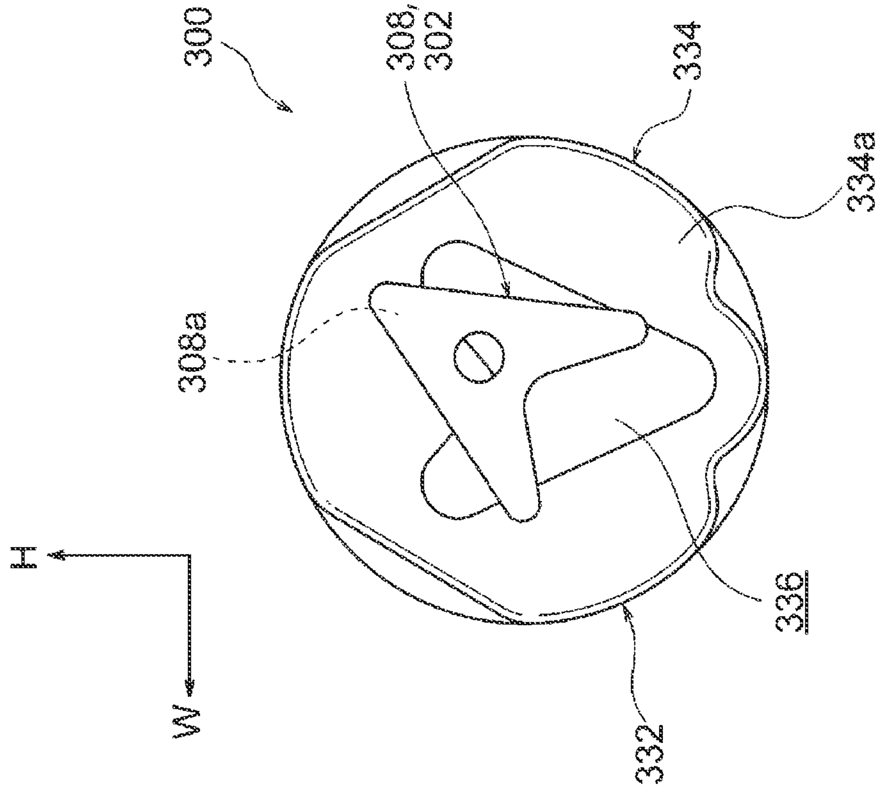

Operations of Power Transmission Member 300 According to Comparative Example In the power transmission member 300, when the male member 302 and the female member 332 are located in positions different from the predetermined opposing positions in the circumferential direction, as illustrated in FIGS. 12A and 12B, the top surface 308*a* of the arrow portion 308 in the male member 302 and the body surface 334*a* of the body portion 334 in the female member 332 come into contact with each other in the axial direction with an urging force of an urging member not illustrated.

Figure 13B:
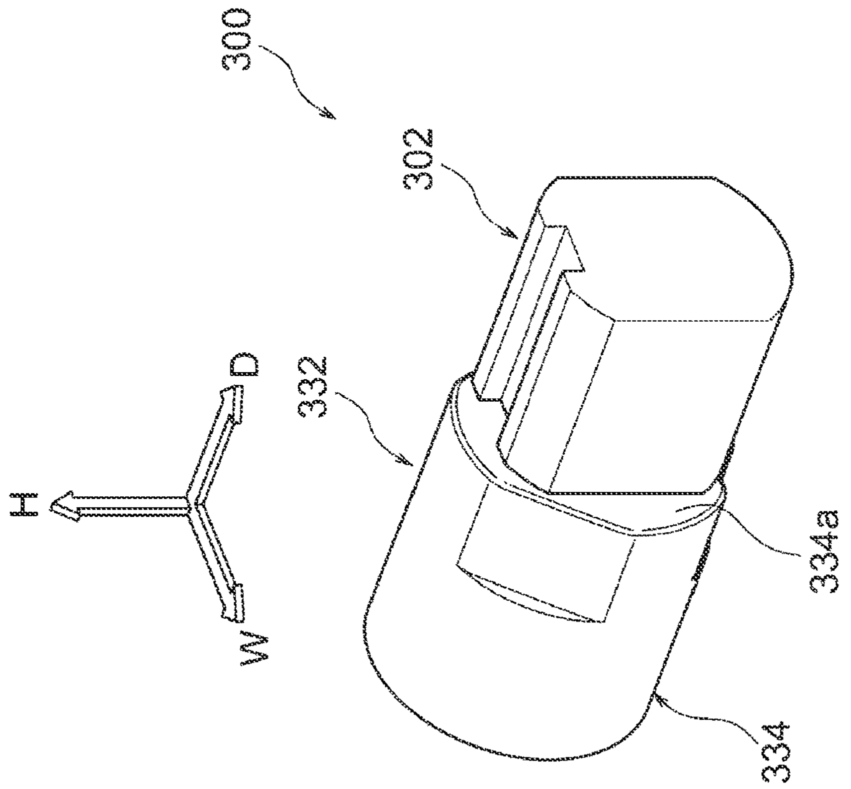
FIGS. 13A and 13B are respectively a front view and a perspective view of a power transmission member according to a comparative example with reference to the exemplary embodiment of the present disclosure where the male member and the female member are disposed in the predetermined opposing positions in the circumferential direction.
Figure 13A:
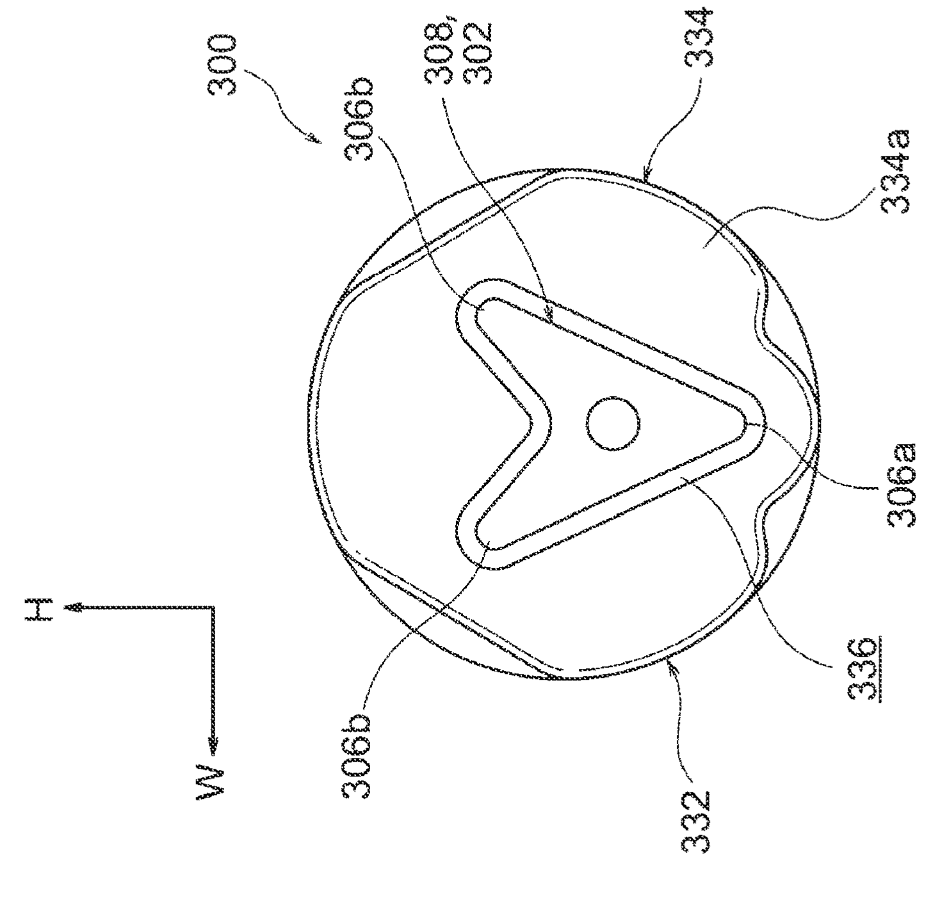

When the male member 302 and the female member 332 are located in the predetermined opposing positions in the circumferential direction, as illustrated in FIGS. 13A and 13B, the arrow portion 308 having the three engagement teeth 306 and the to-be-engaged portion 336 are moved relative to each other in the axial direction with the urging force of an urging member not illustrated. Then, the engagement teeth 306 and the to-be-engaged portion 336 are engaged with each other, and the male member 302 and the female member 332 are fitted to each other. While the male member 302 and the female member 332 are fitted to each other, a rotational force is transmittable between the male member 302 and the female member 332.

As illustrated in FIG. 11, the thickness T11 of the engagement tooth 306*a* in the male member 302 in the radial direction and the thickness T12 of the engagement teeth 306*b* in the radial direction are different from each other. Thus, the shape of the engagement teeth 306 may vary from product to product due to the variation in die shrinkage during forming.

Thus, in the power transmission member 300 according to the comparative example, a large gap is to be set between the engagement teeth 306 and the to-be-engaged portion 336 in the circumferential direction. In other words, a large quantity of backlash is to be left in the circumferential direction between the engagement teeth 306 and the to-be-engaged portion 336.

Subsequently, an operation of transmitting a rotational force from the apparatus body 10*a* to the rotation shaft 80*a* (refer to FIG. 3) of the eccentric cam 80 using the power transmission member 300 according to the comparative example is described with reference to FIGS. 14A, 14B, and 14C.

Figure 14A:
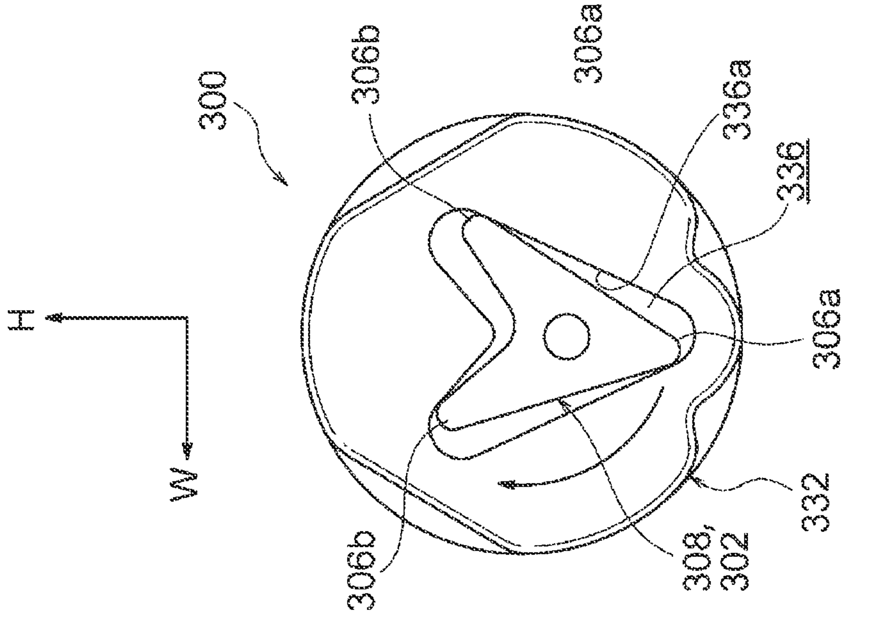
FIGS. 14A, 14B, and 14C are process charts of a power transmission member according to a comparative example with reference to the exemplary embodiment of the present disclosure where the male member transmits a rotational force to the female member.

When the arrow portion 308 located closer to the apparatus body 10*a* rotates clockwise while the engagement teeth 306 of the arrow portion 308 are engaged with the to-be-engaged portion 336, as illustrated in FIG. 14A, the respective engagement teeth 306 come into contact with a peripheral surface 336*a* of the to-be-engaged portion 336 in the circumferential direction. In this state, when the arm 76 illustrated in FIG. 3 is urged toward the eccentric cam 80, the eccentric cam 80 bears the counterclockwise rotational force. In other words, the female member 332 including the to-be-engaged portion 336 bears the counterclockwise rotational force.

Figure 14B:
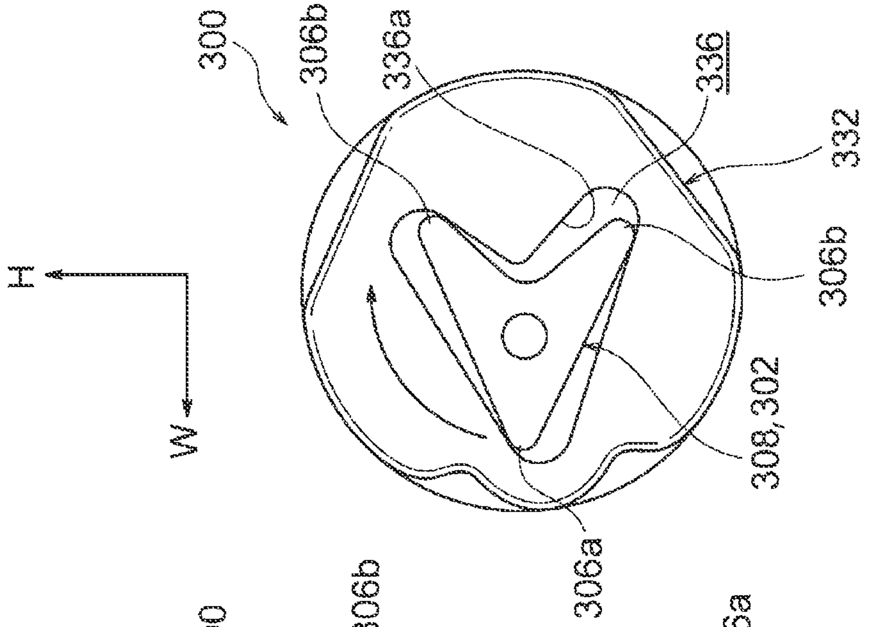
Figure 14C:
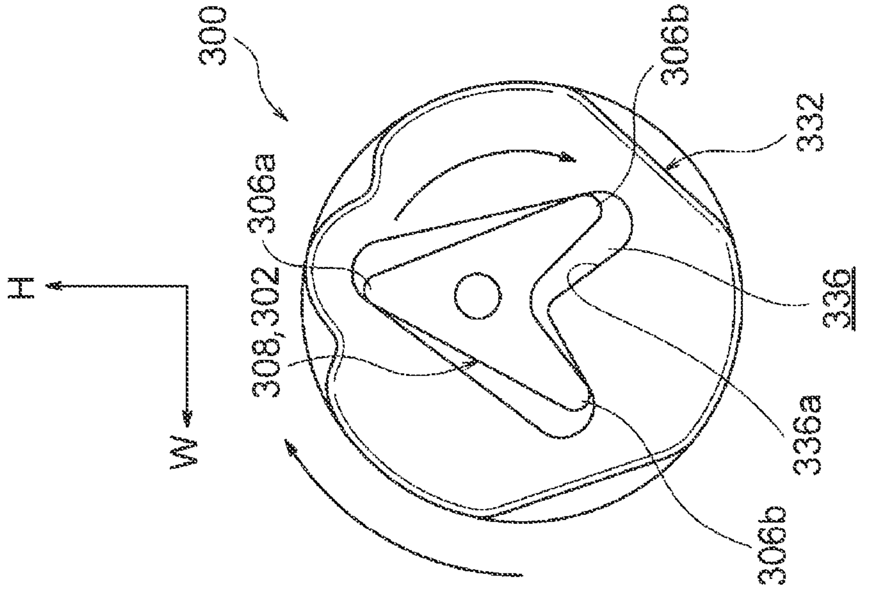

As illustrated in FIG. 14B and FIG. 14C, when the arrow portion 308 of the male member 302 rotates clockwise, the female member 332 including the to-be-engaged portion 336 is pushed by the male member 302 in the circumferential direction to rotate clockwise. When the female member 332 is rotated half a turn, the transfer portion 32 shifts from the color mode to the monochrome mode.

When the arm 76 illustrated in FIG. 3 is urged toward the eccentric cam 80 while the female member 332 is rotated half a turn, the eccentric cam 80 that is prepared to rotate counterclockwise is prepared to rotate clockwise. When exceeding a so-called dead point, the eccentric cam 80 that is prepared to rotate counterclockwise is prepared to rotate clockwise.

As illustrated in FIG. 14B and FIG. 14C, the positions of the respective engagement teeth 306 that are in contact with the peripheral surface 336*a* of the to-be-engaged portion 336 in the circumferential direction are shifted from one to another in the circumferential direction. This shift of the contact positions causes impulsive tones. As described above, the power transmission member 300 according to the comparative example is to have a large gap between the engagement teeth 306 and the peripheral surface 336*a* forming the to-be-engaged portion 336 in the circumferential direction. This structure also increases impulsive tones.

Figure 8B:
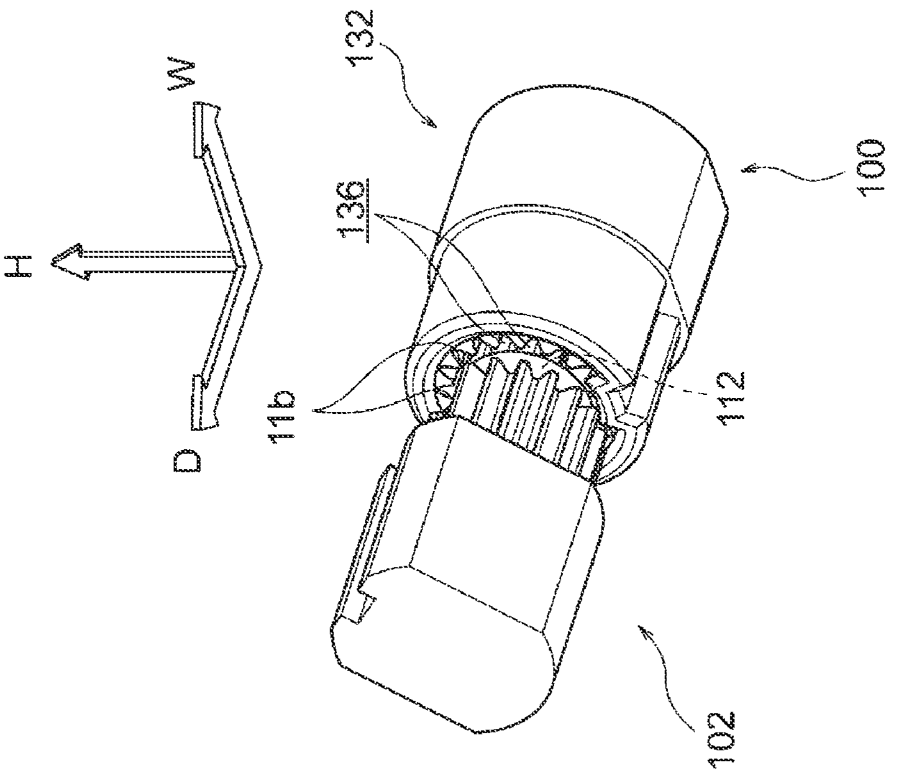
FIGS. 8A and 8B are a front view and a perspective view of a power transmission member according to an exemplary embodiment of the present disclosure where the male member and the female member are located in positions different from predetermined opposing positions in the circumferential direction.
Figure 8A:
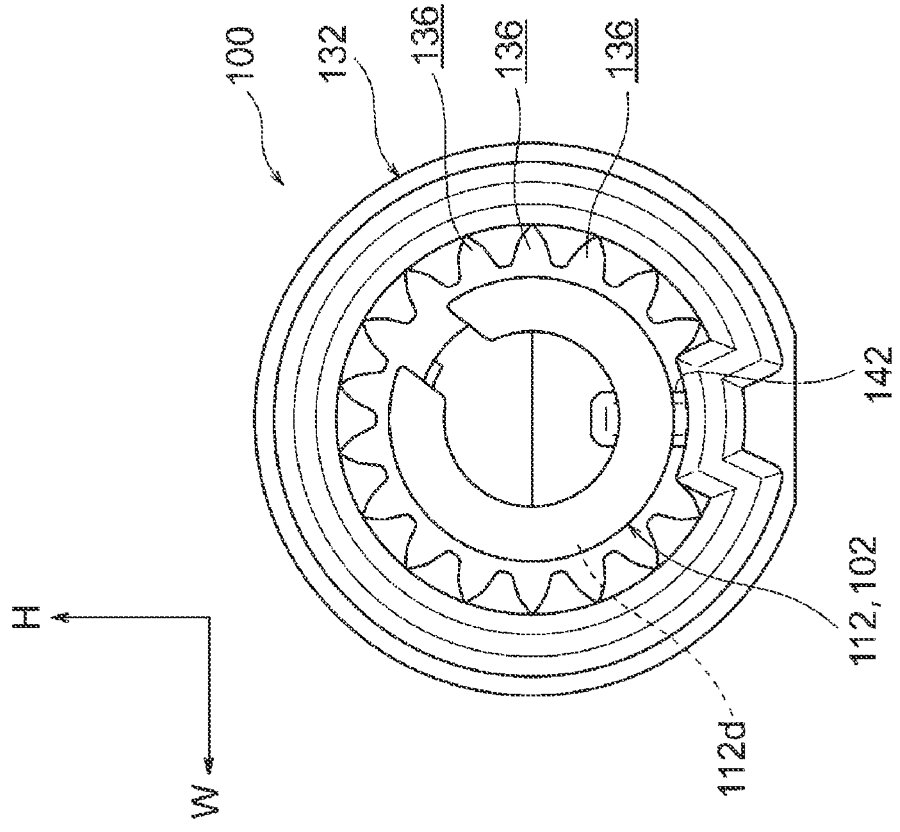

Operation of Power Transmission Member 100 According to Present Exemplary Embodiment In the power transmission member 100, when the male member 102 and the female member 132 are located in positions different from the predetermined opposing positions in the circumferential direction, as illustrated in FIGS. 8A and 8B, the top surface 112*d* of the arc-shaped portion 112 of the male member 102 and the insertion portion 142 of the female member 132 come into contact with each other in the axial direction with an urging force of an urging member not illustrated. In this state, the engagement teeth 106 and the to-be-engaged portions 136 are spaced apart from each other in the axial direction.

Figure 9B:
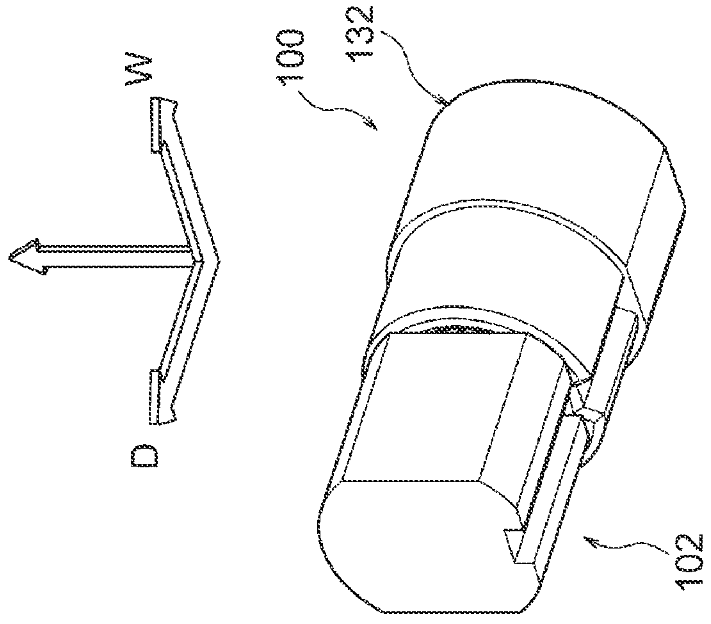
FIGS. 9A and 9B are a front view and a perspective view of a power transmission member according to an exemplary embodiment of the present disclosure where the male member and the female member are disposed in the predetermined opposing positions in the circumferential direction.
Figure 9A:
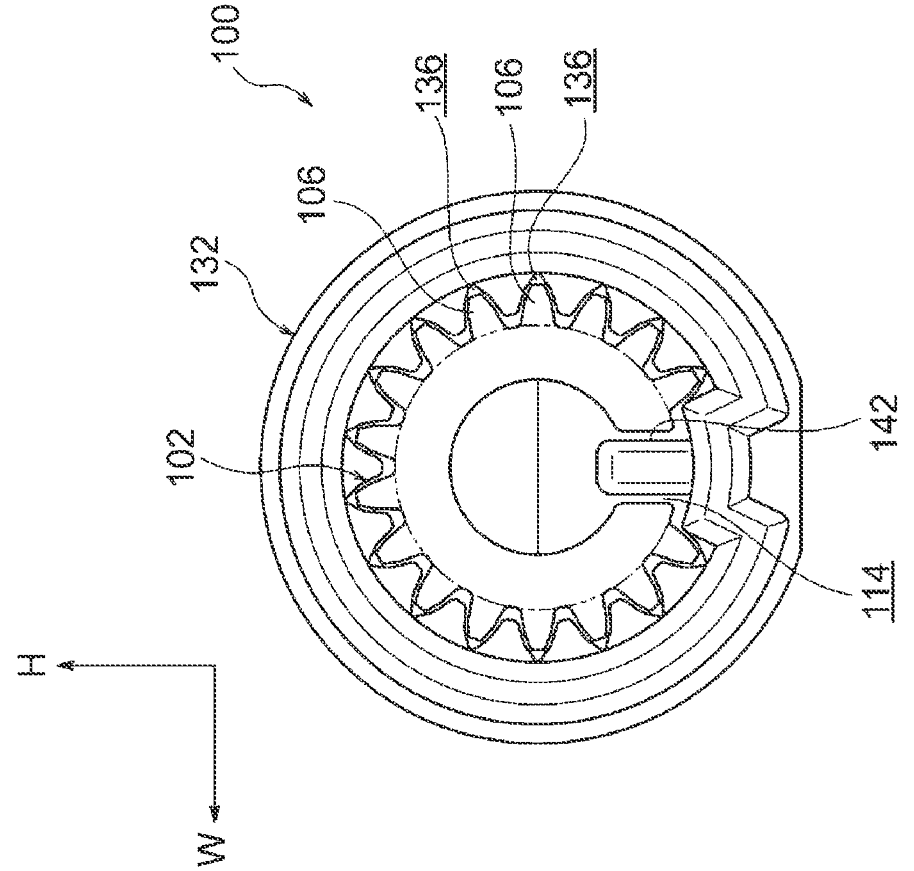

When the male member 102 and the female member 132 are located in the predetermined opposing positions in the circumferential direction, as illustrated in FIGS. 9A and 9B, the insertion portion 142 is inserted into the cut portion 114 with an urging force of an urging member not illustrated. Thus, the engagement teeth 106 and the to-be-engaged portions 136 are moved relative to each other in the axial direction to be engaged with each other, and the male member 102 and the female member 132 are fitted to each other.

While the male member 102 and the female member 132 are fitted to each other, the rotational force is transmittable between the male member 102 and the female member 132.

The multiple engagement teeth 106 are arranged at regular intervals in the circumferential direction. The engagement teeth 106 have a uniform thickness in the radial direction. This structure reduces the variation of the shape of the engagement teeth 106 from product to product attributable to the variation of die shrinkage during forming, compared to the power transmission member 300 according to the comparative example.

Thus, in the power transmission member 100 according to the present exemplary embodiment, a gap between each of the engagement teeth 106 and the corresponding one of the to-be-engaged portions 336 is smaller than that in the power transmission member 300 according to the comparative example. In other words, the quantity of backlash left between the engagement teeth 106 and the to-be-engaged portions 136 in the circumferential direction is smaller than that in the power transmission member 300.

Summarization

As described above, among power transmission members including the male member 102 and the female member 132 that are to be fitted to each other at predetermined positions in the circumferential direction, the power transmission member 100 further reduces the quantity of backlash left between the engagement teeth 106 and the to-be-engaged portions 136 in the circumferential direction than the power transmission member 300.

In the power transmission member 100, when the quantity of backlash left between the engagement teeth 106 and the to-be-engaged portions 136 in the circumferential direction is reduced, impulsive tones caused due to the backlash are further reduced than in the case of the power transmission member 300.

In the power transmission member 100, the arc-shaped portion 112 is disposed closer to the base ends of the engagement teeth 106 (closer to the center). Thus, the male member 102 is smaller than in the case where the arc-shaped portion is disposed closer to the distal ends of the engagement teeth.

In the power transmission member 100, the arc-shaped portion 112 is connected to the base end portions of the engagement teeth 106. Thus, the engagement teeth 106 have higher stiffness than in the case where the arc-shaped portion and the engagement teeth are spaced apart from each other.

In the power transmission member 100, the thickness of the arc-shaped portion 112 in the radial direction is uniform in the circumferential direction. Thus, compared to the case where the thickness of the arc-shaped portion 112 in the radial direction varies in the circumferential direction, the variation of the shape of the engagement teeth 106 resulting from die shrinkage of the arc-shaped portion 112 is reduced.

In the power transmission member 100, when the male member 102 and the female member 132 are located in positions different from the predetermined opposing positions in the circumferential direction, the engagement teeth 106 and the to-be-engaged portions 136 are spaced apart from each other in the axial direction while the insertion portion 142 of the female member 132 is in contact with the top surface 112*d* of the arc-shaped portion 112 of the male member 102. Thus, compared to the case where the engagement teeth and the to-be-engaged portion are in contact with each other in the axial direction while the insertion portion is in contact with the top surface of the arc-shaped portion, the engagement teeth 106 and the to-be-engaged portions 136 are prevented from being engaged with each other while the male member 102 and the female member 132 are located in positions different from the predetermined opposing positions in the circumferential direction.

In the power transmission member 100, the arc-shaped portion 112 has the top surface 112*d* with which the insertion portion 142 is in contact. Thus, the end portion of the arc-shaped portion 112 is prevented from being deformed unlike in the case where the insertion portion comes into point contact with the arc-shaped portion.

The transfer portion 32 is switched between the color mode and the monochrome mode with the rotational force transmitted to the eccentric cam 80 through the power transmission member 100. Thus, when the mode is switched between the color mode and the monochrome mode, impulsive tones attributable to backlash are further reduced than in a structure where the rotational force is transmitted through the power transmission member 300.

The image forming apparatus 10 includes the transfer portion 32 to which the rotational force is transmitted through the power transmission member 100. This structure further reduces unusual sounds than in a structure including a transfer portion to which a rotational force is transmitted through the power transmission member 300.

Although a specific exemplary embodiment of the present disclosure has been described in detail, it is apparent for those skilled in the art that the present disclosure is not limited to the exemplary embodiment, but may include various other exemplary embodiments within the scope of the present disclosure. For example, in the above exemplary embodiment, the arc-shaped portion 112 is disposed closer to the base ends of the engagement teeth 106, but the arc-shaped portion may be disposed closer to the distal ends of the engagement teeth. This structure has no effect otherwise exerted when the arc-shaped portion 112 is disposed closer to the base ends of the engagement teeth 106.

In the above exemplary embodiment, the arc-shaped portion 112 is connected to the base end portions of the engagement teeth 106, but may be spaced apart from the engagement teeth. This structure has no effect otherwise exerted when the arc-shaped portion 112 is connected to the base end portions of the engagement teeth 106.

In the exemplary embodiment, the thickness of the arc-shaped portion 112 in the radial direction is uniform in the circumferential direction, but may be ununiform. This structure has no effect otherwise exerted when the thickness of the arc-shaped portion 112 in the radial direction is uniform in the circumferential direction.

In the exemplary embodiment, the arc-shaped portion 112 has an arc shape, but may have a cylindrical shape. This structure has no effect otherwise exerted when the arc-shaped portion 112 has an arc shape.

In the exemplary embodiment, one fitting portion 120 is disposed to extend in the circumferential direction. Instead, multiple fitting portions 120 may be arranged in the circumferential direction.

In the exemplary embodiment, the power transmission member 100 is used to transmit the rotational force to the eccentric cam 80 of the transfer portion 32 in the image forming apparatus 10. Instead, the power transmission member 100 may be used to transmit the rotational force to another member such as the image carrier, the developing device, or the fixing device in the image forming apparatus 10.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A power transmission member, comprising:

a male member formed from a resin material and including a plurality of engagement teeth arranged at regular intervals in a circumferential direction when viewed in an axial direction, the engagement teeth having a uniform thickness in a radial direction;

a female member including a to-be-engaged portion to which the engagement teeth are fitted as a result of the female member moving in the axial direction relative to the male member; and a fitting member disposed at the male member and the female member, the fitting member fitting the engagement teeth to the to-be-engaged portion while the male member and the female member are located in predetermined opposing positions in the circumferential direction to engage the male member and the female member with each other.

(((2)))

The power transmission member according to (((1))), wherein the fitting member includes:

a shaft portion disposed at the male member and located closer to base ends of the engagement teeth, the shaft portion including a cut portion; and an insertion portion disposed at the female member, the insertion portion being inserted into the cut portion while the male member and the female member are located in the predetermined opposing positions in the circumferential direction.

(((3)))

The power transmission member according to (((2))), wherein the shaft portion is connected to base end portions of the engagement teeth.

(((4)))

The power transmission member according to (((3))), wherein the shaft portion has an arc shape with the cut portion disposed between a first end and a second end when viewed in the axial direction, and wherein a thickness of the shaft portion in the radial direction is uniform in the circumferential direction.

(((5)))

The power transmission member according to any one of (((2))) to (((4))), wherein:

when the male member and the female member are located in positions different from the predetermined opposing positions in the circumferential direction, the engagement teeth and the to-be-engaged portion are spaced apart from each other in the axial direction while the insertion portion and an end portion of the shaft portion are in contact with each other in the axial direction.

(((6)))

The power transmission member according to (((5))), wherein the shaft portion has, at an end portion, an end surface facing in the axial direction and with which the insertion portion is in contact.

(((7)))

A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to any one of (((1))) to (((6))).

(((8)))

An image forming apparatus, comprising:

a plurality of image carriers that hold images; and the transfer device according to (((7))) that transfers the images held by the image carrier to a recording medium.

What is claimed is:

1. A power transmission member, comprising:

a male member including a plurality of engagement teeth arranged at regular intervals in a circumferential direction when viewed in an axial direction, the engagement teeth each protruding in a radial direction from a central hub and having a uniform thickness in the radial direction;

a female member including a plurality of to-be-engaged portion grooves to which the engagement teeth are configured to be fitted into as a result of the female member moving in the axial direction relative to the male member; and a fitting member disposed on at least one of the male member and the female member, the fitting member fitting the engagement teeth to the to-be-engaged portion grooves while the male member and the female member are located in predetermined opposing positions in the circumferential direction to engage the male member and the female member with each other.

2. The power transmission member according to claim 1, wherein the fitting member includes:

a shaft portion disposed at the male member and located closer to base ends of the engagement teeth, the shaft portion including a cut portion, the shaft portion forming the central hub; and an insertion portion disposed at the female member, the insertion portion being inserted into the cut portion while the male member and the female member are located in the predetermined opposing positions in the circumferential direction.

3. The power transmission member according to claim 2, wherein the shaft portion is connected to base end portions of the engagement teeth.

4. The power transmission member according to claim 3, wherein the shaft portion has an arc shape with the cut portion disposed between a first end and a second end when viewed in the axial direction, and wherein a thickness of the shaft portion in the radial direction is uniform in the circumferential direction.

5. The power transmission member according to claim 2, wherein:

when the male member and the female member are located in positions different from the predetermined opposing positions in the circumferential direction, the engagement teeth and the to-be-engaged portion grooves are spaced apart from each other in the axial direction while the insertion portion and an end portion of the shaft portion are in contact with each other in the axial direction.

6. The power transmission member according to claim 5, wherein the shaft portion has, at an end portion, an end surface facing in the axial direction and with which the insertion portion is in contact.

7. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 1.

8. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 2.

9. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 3.

10. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 4.

11. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 5.

12. A transfer device, comprising:

an endless member that rotates;

a plurality of first transfer members disposed to face a plurality of image carriers arranged in a rotation direction of the endless member with the endless member interposed therebetween, the first transfer members transferring images held on the image carriers to the endless member;

a second transfer member that transfers the images transferred to the endless member to a recording medium; and a distance changer that moves at least a subset of the plurality of first transfer members to move the endless member and the image carrier toward and away from each other with a rotational force transmitted through the power transmission member according to claim 6.

13. An image forming apparatus, comprising:

a plurality of image carriers that hold images; and the transfer device according to claim 7 that transfers the images held by the image carrier to a recording medium.

14. An image forming apparatus, comprising:

a plurality of image carriers that hold images; and the transfer device according to claim 8 that transfers the images held by the image carrier to a recording medium.

15. An image forming apparatus, comprising:

a plurality of image carriers that hold images; and the transfer device according to claim 9 that transfers the images held by the image carrier to a recording medium.

16. An image forming apparatus, comprising:

a plurality of image carriers that hold images; and the transfer device according to claim 10 that transfers the images held by the image carrier to a recording medium.

17. An image forming apparatus, comprising:

a plurality of image carriers that hold images; and the transfer device according to claim 11 that transfers the images held by the image carrier to a recording medium.

18. An image forming apparatus, comprising:

a plurality of image carriers that hold images; and the transfer device according to claim 12 that transfers the images held by the image carrier to a recording medium.

* * * * *